United States Patent Office 3,072,623
Patented Jan. 8, 1963

3,072,623
HOMOPOLYMER OF p-DIOXENE AND PREPARATION THEREOF
Nathan David Field, Wilmington, Del., assignor to E. I. du Pont de Nemours and Company, Wilmington, Del., a corporation of Delaware
No Drawing. Filed July 12, 1960, Ser. No. 42,227
3 Claims. (Cl. 260—88.3)

This invention relates to a novel homopolymer, and more specifically to a water-soluble, high melting polymerization product of para-dioxene prepared by cationic polymerization. It is an object of the present invention to provide a novel polymer having recurring units of the structure

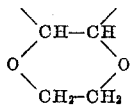

said polymer being water-soluble, yet having a high melting point and high enough molecular weight to afford useful films, coatings, and the like. This and other objects will become apparent in the course of the following specification and claims.

In accordance with the present invention, polymers are prepared from para-dioxene having the structure

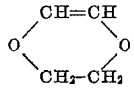

which are water soluble to the extent of at least five percent solids, have a melting temperature higher than 250° C. and have an inherent viscosity, measured in methylene chloride, greater than 0.5.

The following example is given in illustration and is not intended as a limitation on the scope of this invention.

Example I

A solution of para-dioxene, $n_D^{22}$ 1.4359, in methylene chloride is made in a 1 to 5 volume ratio and at Dry Ice-acetone temperature under nitrogen in a stirred flask. A small amount of boron trifluoride gas is introduced and stirring is continued for ten minutes. The polymer product is recovered and purified by precipitation and washing with methanol and dried in vacuo. The yield of polymer is 50%. The polymer is soluble at least 5% by weight in water and in methylene chloride. The polymer melt temperature, determined on a heated bar, is about 280° C., and the polymer demonstrates excellent heat oxidative stability up to this temperature on the hot bar. Drawable films are cast from methylene chloride solutions of the polymer. The inherent viscosity measured in methylene chloride is 0.69.

Other suitable solvents, catalysts, temperatures, times and methods and conditions for carrying out the polymerization are those commonly employed in low temperature cationic polymerization, as for example, those used for the polymerization of isobutylene and methyl vinyl ether, as described in C. E. Schildknecht, "Vinyl and Related Polymers," John Wiley and Sons, Inc., New York (1952), pages 555–557 and 598–602. No polymer is obtained when the monomeric paradioxene is treated with a typical free-radical polymerization initiator such as azobisisobutyronitrile.

The polymer of this invention is useful as a water-soluble pill coating or encapsulating material. It is also useful for packaging pouches for detergents, bleaches, dyes, etc., where the pouch may be put in an aqueous system to release its contents by dissolution.

Many equivalent modifications of the above will be apparent to those skilled in the art without a departure from the inventive concept.

What is claimed is:

1. A process for polymerizing p-dioxene comprising treating the monomer with boron trifluoride at low temperature attainable with Dry-Ice-acetone and obtaining a homopolymer of p-dioxene having a melting point above about 250° C., a water solubility greater than 5%, and an inherent viscosity measured in methylene chloride greater than 0.5.

2. The process of claim 1 carried out in a solution of methylene chloride wherein the ratio of p-dioxene to methylene chloride on a volume basis is 1:5.

3. A water-soluble packaging film of poly(p-dioxene) having a melting point above about 250° C., a water solubility greater than 5%, and an inherent viscosity measured in methylene chloride greater than 0.5.

References Cited in the file of this patent

UNITED STATES PATENTS

| | | |
|---|---|---|
| 2,098,108 | Reppe | Nov. 2, 1937 |
| 2,841,574 | Foster | July 1, 1958 |